US012424001B2

(12) United States Patent
Cao et al.

(10) Patent No.: US 12,424,001 B2
(45) Date of Patent: Sep. 23, 2025

(54) PREDICTING PATIENT RESPONSES TO A CHEMICAL SUBSTANCE

(71) Applicant: Sanofi, Paris (FR)

(72) Inventors: Wenzhi Cao, Seattle, WA (US); Yechi Ma, Lawrenceville, NJ (US); Qi Tang, Bridgewater, NJ (US)

(73) Assignee: Sanofi, Paris (FR)

( * ) Notice: Subject to any disclaimer, the term of this patent is extended or adjusted under 35 U.S.C. 154(b) by 826 days.

(21) Appl. No.: 17/633,116

(22) PCT Filed: Aug. 10, 2020

(86) PCT No.: PCT/US2020/045624
§ 371 (c)(1),
(2) Date: Feb. 4, 2022

(87) PCT Pub. No.: WO2021/030270
PCT Pub. Date: Feb. 18, 2021

(65) Prior Publication Data
US 2022/0318993 A1 Oct. 6, 2022

Related U.S. Application Data

(60) Provisional application No. 62/886,199, filed on Aug. 13, 2019.

(30) Foreign Application Priority Data

Jan. 16, 2020 (EP) .................................... 20305030

(51) Int. Cl.
*G06V 20/69* (2022.01)
*G06T 7/00* (2017.01)
(Continued)

(52) U.S. Cl.
CPC .......... *G06V 20/695* (2022.01); *G06T 7/0012* (2013.01); *G06V 10/454* (2022.01);
(Continued)

(58) Field of Classification Search
CPC .... G06V 20/695; G06V 10/454; G06V 10/50; G06V 10/82; G06V 20/698;
(Continued)

(56) References Cited

U.S. PATENT DOCUMENTS 11,741,365 B2 * 8/2023 Khan .................... G06N 3/048
706/25
2014/0297199 A1 10/2014 Osten
(Continued)

FOREIGN PATENT DOCUMENTS

| JP | 2015-507470 A | 3/2015 |
|---|---|---|
| WO | WO 2013/071099 | 5/2013 |
| WO | WO 2018/156133 | 8/2018 |

OTHER PUBLICATIONS

Ngiam et al., "Tiled convolutional neural networks," Advances in Neural Information Processing Systems, Dec. 9, 2010, 23:1279-1287.
(Continued)

*Primary Examiner* — Lewis G West
(74) *Attorney, Agent, or Firm* — Fish & Richardson P.C.

(57) ABSTRACT

In an aspect, a data processing system includes a computer-readable memory comprising computer-executable instructions, and at least one processor configured to execute executable logic including at least one artificial neural network trained to predict one or more responses to a chemical substance by identifying one or more discrete biological tissue components in a biological image. When the at least one processor is executing the computer-executable instructions, the at least one processor is configured to
(Continued)

carry out operations including: receiving spatially arranged image data representing a biological image of a patient; generating spatially arranged image tile data representing a plurality of image tiles; processing the spatially arranged image tile data through one or more data structures storing one or more portions of executable logic included in the artificial neural network to predict one or more responses of a patient.

20 Claims, 6 Drawing Sheets

(51) Int. Cl.
  *G06V 10/44* (2022.01)
  *G06V 10/50* (2022.01)
  *G06V 10/82* (2022.01)
(52) U.S. Cl.
  CPC .............. *G06V 10/50* (2022.01); *G06V 10/82* (2022.01); *G06V 20/698* (2022.01); *G06T 2207/20021* (2013.01); *G06T 2207/20084* (2013.01); *G06T 2207/30024* (2013.01); *G06T 2207/30096* (2013.01); *G06V 2201/03* (2022.01)
(58) Field of Classification Search
  CPC .............. G06V 2201/03; G06T 7/0012; G06T 2207/20021; G06T 2207/20084; G06T 2207/30024; G06T 2207/30096; G06F 18/24133
  See application file for complete search history.

(56) References Cited

U.S. PATENT DOCUMENTS

| | | | |
|---|---|---|---|
| 2017/0169567 A1 | 6/2017 | Chefd'Hotel et al. | |
| 2019/0204088 A1* | 7/2019 | Haque | G06N 3/02 |
| 2019/0206056 A1 | 7/2019 | Georgescu et al. | |
| 2020/0272864 A1* | 8/2020 | Faust | G06V 10/764 |
| 2020/0388029 A1* | 12/2020 | Saltz | G06V 10/267 |
| 2021/0081821 A1* | 3/2021 | Sasaki | G06N 20/00 |
| 2023/0143701 A1* | 5/2023 | Bauchet | G06V 10/75 |
| | | | 382/128 |

OTHER PUBLICATIONS

Rawat et al., "Deep convolutional neural networks for image classification: A comprehensive review," Neural computation, Aug. 24, 2017, 29(9):2352-2449.
Anonymous, "Color Normalization," Jul. 15, 2019, retrieved on Feb. 14, 2022, retrieved from URL<"https://en.wikipedia.org/w/index.php?title=Color_normalization&oldid=906448932">, 6 pages.
BenTaieb et al., "Predicting Cancer with a Recurrent Visual Attention Model for Histopathology Images," MICCAI 2018: Medical Image Computing and Computer Assisted Intervention, Sep. 2018, pp. 129-137.
Bychkov et al., "Deep learning based tissue analysis predicts outcome in colorectal cancer," Scientific Reports, Feb. 2018, 8(3395): 1-11.
fda.gov [online], "FDA expands pembrolizumab indication for first-line treatment of NSCLC (TPS 1%)," Apr. 11, 2019, retrieved on Feb. 14, 2022, retrieved from URL <"https://www.fda.gov/drugs/fda-expands-pembrolizumab-indication-first-line-treatment-nsclc-tps-1">, 2 pages.
Hamilton et al., "Digital pathology and image analysis in tissue biomarker research," Methods, Nov. 2014, 70(1): 59-73.
International Search Report and Written Opinion in International Appln. No. PCT/US2020/045624, dated Oct. 19, 2020, 12 pages.
Janowczyk et al., "Deep learning for digital pathology image analysis: A comprehensive tutorial with selected use cases," Journal of Pathology Informatics, Jul. 2016, 7:29, 18 pages.
Kato et al., "Counterpoint: Successes in the Pursuit of Precision Medicine: Biomarkers Take Credit," Journal of the National Comprehensive Cancer Network, Jul. 2017, 15(7): 863-866.
Komura et al., "Machine Learning Methods for Histopathological Image Analysis," Computational and Structural Biotechnology Journal, 2018, 16: 34-42.
LeCun et al., "Deep learning," Nature, May 2015, 521: 436-444.
Litjens et al., "A survey on deep learning in medical image analysis," Medical image Analysis, Dec. 2017, 42: 60-88.
Madabhushi et al., "Image analysis and machine learning in digital pathology: Challenges and opportunities," Medical Image Analysis, Oct. 2016, 33: 170-175.
Mobadersany et al., "Predicting cancer outcomes from histology and genomics using convolutional networks," Proceedings of the National Academy of Sciences of the United States of America, Mar. 2018, 115(13): E2970-E2979.
Momeni et al., "Deep Recurrent Attention Models for Histopathological Image Analysis," bioRxiv, Oct. 2018, 5 pages.
Peters et al., "PD-1 blockade in advanced Nsclc: A focus on pembrolizumab," Cancer Treatment Reviews, Jan. 2018, 62: 39-49.
Silva et al., "PD-L1 immunostaining scoring for non-small cell lung cancer based on immunosurveillance parameters, " PLOS One, Jun. 2018, 13(6): e0196464, 15 pages.
International Preliminary Report on Patentability in International Appln. No. PCT/US2020/045624, dated Feb. 24, 2022, 10 pages.

* cited by examiner

US 12,424,001 B2

PREDICTING PATIENT RESPONSES TO A CHEMICAL SUBSTANCE

CROSS REFERENCE TO RELATED APPLICATIONS

The present application is the national stage entry of International Patent Application No. PCT/US2020/045624, filed on Aug. 10, 2020, and claims priority to Application No. EP 20305030.7, filed on Jan. 16, 2020 and U.S. Provisional Application No. 62/886,199, filed on Aug. 13, 2019. The disclosures of which are incorporated herein by reference.

FIELD OF THE INVENTION

This disclosure generally relates to systems and methods that predict patient responses to chemical compounds, such as pharmaceutical drugs.

BACKGROUND

Clinical trials are typically conducted to collect data regarding the safety and efficacy of pharmaceutical drugs. Generally, these trials involve one or more phases that determine whether a drug can be sold in a consumer market. For example, a clinical trial may include three phases. In the first phase, the drugs are tested on a relatively small number of paid volunteers (e.g., 20 to 100 volunteers) to determine the effects of the drug, including absorption, metabolization, excretion, and so forth. This phase can take several months to complete and approximately 70% of experimental drugs pass the first phase. In the second phase, the experimental drugs are tested on several hundred patients that meet one or more inclusion criteria. One group of patients receive the experimental drugs while another group receives a placebo or a standard treatment. About one-third of experimental drugs complete both phase one and phase two of testing. During the third phase, the drugs are tested on several hundred to several thousands of patients (or more). This phase tends to be the most costly of all phases, and approximately 70% of drugs that enter phase three may successfully complete the phase.

SUMMARY

In at least one aspect of the present disclosure, a data processing system is provided. The data processing system includes a computer-readable memory comprising computer-executable instructions; and at least one processor configured to execute executable logic including at least one artificial neural network trained to predict one or more responses to a chemical substance by identifying one or more discrete biological tissue components in a biological image. When the at least one processor is executing the computer-executable instructions, the at least one processor is configured to carry out one or more operations. The one or more operations includes receiving spatially arranged image data representing a biological image of a patient. The one or more operations include generating spatially arranged image tile data representing a plurality of image tiles, in which each image tile of the plurality of image tiles comprises a discrete portion of the biological image. The one or more operations include processing the spatially arranged image tile data through one or more data structures storing one or more portions of executable logic included in the artificial neural network to predict one or more responses of a patient by identifying, for each image tile, one or more pixels of that image tile representing one or more locations of discrete biological tissue components of the patient.

The one or more operations can include generating preprocessed spatially arranged image tile data representing, for each image tile, a preprocessed image tile. Generating preprocessed spatially arranged image tile data can include, for each image tile, identifying one or more pixels of that image tile representing one or more locations of biological tissue and color normalizing the one or more locations of biological tissue. The spatially arranged image tile data that is processed through the one or more data structures storing one or more portions of executable logic included in the artificial neural network can include the preprocessed spatially arranged image tile data.

The artificial neural network can include a convolutional neural network.

Predicting the one or more responses of a patient can include, for each image tile, assigning a weighting value for that image tile. The assigned weighting value for each image tile can be based on the predictive power of the discrete biological tissue components of that image tile.

In at least one aspect, a data processing system is provided. The data processing system includes a computer-readable memory comprising computer-executable instructions. The data processing system includes at least one processor configured to execute executable logic including at least one artificial neural network trained to predict one or more responses to a chemical substance by identifying one or more discrete biological tissue components in a biological image. When the at least one processor is executing the computer-executable instructions, the at least one processor is configured to carry out one or more operations. The one or more operations include receiving spatially arranged image data representing a biological image of a patient. The one or more operations include processing the spatially arranged image data through one or more data structures storing one or more portions of executable logic included in the artificial neural network to predict one or more responses of a patient by identifying one or more pixels representing one or more locations of discrete biological tissue components of the patient. Processing the spatially arranged data includes selecting a first portion of the spatially arranged image data. Processing the spatially arranged data includes processing the first portion to identify one or more pixels of the first portion representing one or more locations of discrete biological tissue components corresponding to the first portion. Processing the spatially arranged data includes selecting at least one subsequent portion of the spatially arranged image data. Processing the spatially arranged data includes processing the at least one subsequent portion to identify one or more pixels of the at least one subsequent portion representing one or more locations of discrete biological tissue components corresponding to the at least one subsequent portion.

The biological image can include an Immunohistochemistry image. The artificial neural network can include a deep recurrent attention model. The one or more responses can include an amount of reduction in a size of a tumor.

The one or more operations can include generating preprocessed spatially arranged image data representing a preprocessed biological image. Generating the preprocessed spatially arranged image data can include identifying one or more pixels of the biological image representing one or more locations of biological tissue and color normalizing the one or more locations of biological tissue. The spatially arranged image data that is processed through the one or more data structures storing one or more portions of executable logic included in the artificial neural network can include the preprocessed spatially arranged image data.

These and other aspects, features, and implementations can be expressed as methods, apparatus, systems, components, program products, means or steps for performing a function, and in other ways.

Implementations of the present disclosure can provide one or more of the following advantages. Image processing and machine learning techniques can be used to process image data to predict patient responses to a drug in such a manner that, when compared with traditional techniques, prediction accuracy is increased, computational efficiency is increased, and/or computational power requirements are decreased. When compared to traditional techniques, the predictions can account for an increased number of variables, which can increase the accuracy of the predictions.

These and other aspects, features, and implementations will become apparent from the following descriptions, including the claims.

DETAILED DESCRIPTION

Figure 1:
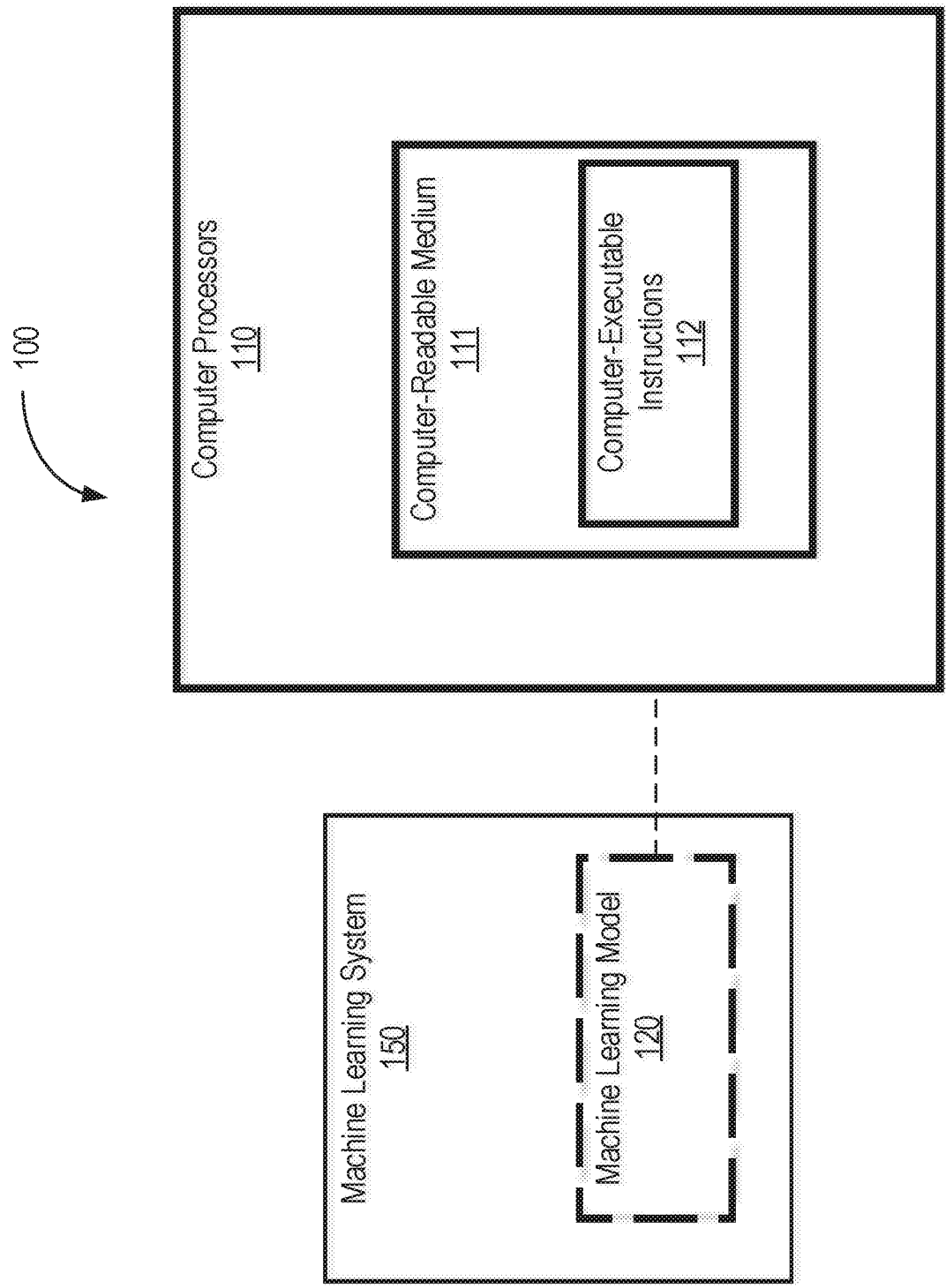
FIG. 1 is a diagram illustrating an example of a data processing system.

For clinical trials involving a given drug, selecting patients to be treated who may benefit from the treatment with manageable side effects can be important, especially in the fields of life threatening diseases, such as oncology. Due to recent advancements in medical imaging technology, medical images or biological images (for example, immunohistochemistry images) can be useful in predicting patient outcomes to an investigational treatment. However, traditional patient outcome predicting techniques typically extract only a few features from the biological images, such as proportional scores and histochemical scores (sometimes referred to as an "H-score"). As a result, the resulting patient response prediction accuracy can range from 20%-45%. Furthermore, using traditional machine learning techniques to predict patient responses to a given drug can be computationally unfeasible, as the biological images can have sizes of 2 gigabytes (or more) with dimensions of 50,000 pixels by 40,000 pixels (or more). That is, images of these size can require a machine learning model to estimate for billions (or more) of parameters.

Implementations of the present disclosure provide systems and methods for predicting patient responses that can be used to alleviate some or all of the aforementioned disadvantages. The system and methods described in the present disclosure can implement image processing techniques, and machine learning techniques, such that image data representing biological images can be processed in a more computationally efficient manner to predict patient responses to a drug with a higher degree of accuracy, when compared with traditional techniques. In some implementations, the systems and methods described in this disclosure can receive a biological image of a patient and generate image tiles, in which each image tile represents a discrete portion of the biological image. Data representing each image tile can then be preprocessed to, for example, identify locations of biological tissue captured in the biological image and color normalize those identified locations. The preprocessed image data can then be processed with an artificial neural network (ANN) that can identify, for each image tile, locations of discrete tissue components that the ANN has learned to be predictive of patient responses for a given drug. That is, based on the identified discrete tissue components, the ANN can identify higher level features from the images that may affect the patient response prediction. For example, the ANN may learn to associate partially stained patterns of targeted proteins on a membrane of a tumor nest with poor patient responses because an active drug ingredient may not recognize the targeted protein to attack the tumor nest. Examples of patient response can include efficacy responses (such as, a reduction/change in the size of a cancerous tumor resulting from the patient undergoing an oncology drug treatment regimen), safety responses (such as adverse reactions, toxicity, and cardiovascular risks resulting from the patient undergoing an oncology drug treatment regimen), or both.

Each of the discrete tissue components can be assigned values based on a learned predictive power (for example, their efficacy to predict a patient response learned by the ANN) and predicting the response can include aggregating the assigned values corresponding to all image tiles. In some implementations, the ANN can be used to process image data representing the entire image, in which the ANN is configured to process one discrete portion (sometimes referred to as a "patch") of the biological image at a time.

By color normalizing the locations of biological tissue in the biological image, increased computational efficiency of processing the biological image data can be facilitated because, for example, the ANN can more easily recognize the locations of the biological tissue, when compared with traditional techniques. Furthermore, by using the ANN to process one discrete portion of the medical image data at a time (for example, one patch at a time or one tile at a time), computational requirement concerns can be alleviated when compared to traditional techniques.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Several features are described hereafter that can each be used independently of one another or with any combination of other features. However, any individual feature may not address any of the problems discussed above or might only address one of the problems discussed above. Some of the problems discussed above might not be fully addressed by any of the features described in this specification. Although headings are provided, data related to a particular heading, but not found in the section having that heading, may also be found elsewhere in this description.

FIG. 1 shows an example of a data processing system 100. Generally, the data processing system is configured to process image data representing a biological image of a patient to predict a patient response (for example, reduction in size of a cancerous tumor) for a given chemical substance (for example, a pharmaceutical drug). The system 100 includes computer processors 110. The computer processors 110 include computer-readable memory 111 and computer readable instructions 112. The system 100 also includes a machine learning system 150. The machine learning system 150 includes a machine learning model 120. The machine learning model 120 can be separate from or integrated with the computer processors 110.

The computer-readable medium 111 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In some implementations, the computer-readable medium 111 includes code-segment having executable instructions.

In some implementations, the computer processors 110 include a general purpose processor. In some implementations, the computer processors 110 include a central processing unit (CPU). In some implementations, the computer processors 110 include at least one application specific integrated circuit (ASIC). The computer processors 110 can also include general purpose programmable microprocessors, graphic processing units, special-purpose programmable microprocessors, digital signal processors (DSPs), programmable logic arrays (PLAs), field programmable gate arrays (FPGA), special purpose electronic circuits, etc., or a combination thereof. The computer processors 110 are configured to execute program code such as the computer-executable instructions 112 and configured to execute executable logic that includes the machine learning model 120.

The computer processors 110 are configured to receive image data representing a medical image of a patient. For example, the medical image of a patient can be an image of the results of immunohistochemically staining, which describes a process of selectively identifying proteins (for example, antigens) in cells of a biological tissue section by exploiting the principle of antibodies binding specifically to antigens in biological tissue. The image data can be obtained through any of various techniques, such as wireless communications with databases, optical fiber communications, USB, CD-ROM, and so forth.

In some implementations, the computer processors 110 are configured to generate image tile data representing a plurality of image tiles in which each image tile includes a discrete portion of the biological image. A more detailed example of generating image tile data is discussed later with reference to FIG. 2. In some implementations, the computer processors 110 are configured to preprocess the image data before transmitting the image data to the machine learning model 120. In some implementations, preprocessing the image data includes identifying one or more pixel locations of the image data corresponding to biological tissue, and color normalizing those identified locations. Color normalization can refer to the process of normalizing different color schemes into a standard color scheme and can increase the contrast between the captured biological tissue/tumor and the image background for more efficient signal identification. For example, the computer processors 110 can associate certain pixel locations in the image data having values (for example, color values, intensity values, and so forth) corresponding to biological tissue, and color normalize those pixel locations. The association can be pre-programmed or learned through one or more machine learning techniques (for example, Bayesian techniques, neural network techniques, etc.).

The machine learning model 120 is capable of processing the image data (in some implementations, after it has been preprocessed by the computer processors 110, after it has been transformed into image tile data, or both) to predict a patient response corresponding to a certain drug. For example, for a given oncology treatment drug regimen, the machine learning model 120 can predict an amount of reduction in the size of a cancerous tumor based on identifying and analyzing one or more pixel locations of the image data representing discrete biological tissue components. In some implementations, predicting the patient response includes assigning values to the identified and analyzed one or more pixel locations representing discrete biological tissue components based on a learned association of the discrete biological tissue components to a patient response. Predicting the patient response is discussed in more detail later with reference to FIGS. 2-5.

The machine learning system 150 is capable of applying machine learning techniques to train the machine learning model 120. As part of the training of the machine learning model 120, the machine learning system 150 forms a training set of input data by identifying a positive training set of input data items that have been determined to have the property in question, and, in some embodiments, forms a negative training set of input data items that lack the property in question.

The machine learning system 150 extracts feature values from the input data of the training set, the features being variables deemed potentially relevant to whether or not the input data items have the associated property or properties. An ordered list of the features for the input data is herein referred to as the feature vector for the input data. In one embodiment, the machine learning system 150 applies dimensionality reduction (e.g., via linear discriminant analysis (LDA), principle component analysis (PCA), or the like) to reduce the amount of data in the feature vectors for the input data to a smaller, more representative set of data.

In some implementations, the machine learning system 150 uses supervised machine learning to train the machine learning models 120 with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model 120, when applied to the feature vector extracted from the input data item, outputs an indication of whether the input data item has the property in question, such as a Boolean yes/no estimate, or a scalar value representing a probability.

In some embodiments, a validation set is formed of additional input data, other than those in the training sets, which have already been determined to have or to lack the property in question. The machine learning system 150 applies the trained machine learning model 120 to the data of the validation set to quantify the accuracy of the machine learning model 120. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have the property in question (TP+FN or false negatives). The F score (F-score=2*PR/(P+R)) unifies precision and recall into a single measure. In one embodiment, the machine learning module iteratively re-trains the machine learning model until the occurrence of a stopping condition, such as the accuracy measurement indication that the model is sufficiently accurate, or a number of training rounds having taken place.

In some implementations, the machine learning model 120 is a convolutional neural network (CNN). A CNN can be configured based on a presumption that inputs to the CNN correspond to image pixel data for an image or other data that includes features at multiple spatial locations. For example, sets of inputs can form a multi-dimensional data structure, such as a tensor, that represent color features of an example digital image (e.g., a biological image of biological tissue). In some implementations, inputs to the CNN correspond to a variety of other types of data, such as data obtained from different devices and sensors of a vehicle, point cloud data, audio data that includes certain features or raw audio at each of multiple time steps, or various types of one-dimensional or multiple dimensional data. A convolutional layer of the CNN can process the inputs to transform features of the image that are represented by inputs of the data structure. For example, the inputs are processed by performing dot product operations using input data along a given dimension of the data structure and a set of parameters for the convolutional layer.

Performing computations for a convolutional layer can include applying one or more sets of kernels to portions of inputs in the data structure. The manner in which CNN performs the computations can be based on specific properties for each layer of an example multi-layer neural network or deep neural network that supports deep neural net workloads. A deep neural network can include one or more convolutional towers (or layers) along with other computational layers. In particular, for example computer vision applications, these convolutional towers often account for a large proportion of the inference calculations that are performed. Convolutional layers of a CNN can have sets of artificial neurons that are arranged in three dimensions, a width dimension, a height dimension, and a depth dimension. The depth dimension corresponds to a third dimension of an input or activation volume and can represent respective color channels of an image. For example, input images can form an input volume of data (e.g., activations), and the volume has dimensions 32×32×3 (width, height, depth respectively). A depth dimension of 3 can correspond to the RGB color channels of red (R), green (G), and blue (B).

In general, layers of a CNN are configured to transform the three dimensional input volume (inputs) to a multi-dimensional output volume of neuron activations (activations). For example, a 3D input structure of 32×32×3 holds the raw pixel values of an example image, in this case an image of width 32, height 32, and with three color channels, R, G, B. A convolutional layer of a CNN of the machine learning model 120 computes the output of neurons that may be connected to local regions in the input volume. Each neuron in the convolutional layer can be connected only to a local region in the input volume spatially, but to the full depth (e.g., all color channels) of the input volume. For a set of neurons at the convolutional layer, the layer computes a dot product between the parameters (weights) for the neurons and a certain region in the input volume to which the neurons are connected. This computation may result in a volume such as 32×32×12, where 12 corresponds to a number of kernels that are used for the computation. A neuron's connection to inputs of a region can have a spatial extent along the depth axis that is equal to the depth of the input volume. The spatial extent corresponds to spatial dimensions (e.g., x and y dimensions) of a kernel.

A set of kernels can have spatial characteristics that include a width and a height and that extends through a depth of the input volume. Each set of kernels for the layer is applied to one or more sets of inputs provided to the layer. That is, for each kernel or set of kernels, the machine learning model 120 can overlay the kernel, which can be represented multi-dimensionally, over a first portion of layer inputs (e.g., that form an input volume or input tensor), which can be represented multi-dimensionally. For example, a set of kernels for a first layer of a CNN may have size 5×5×3×16, corresponding to a width of 5 pixels, a height of 5 pixel, a depth of 3 that corresponds to the color channels of the input volume to which to a kernel is being applied, and an output dimension of 16 that corresponds to a number of output channels. In this context, the set of kernels includes 16 kernels so that an output of the convolution has a depth dimension of 16.

The machine learning model 120 can then compute a dot product from the overlapped elements. For example, the machine learning model 120 can convolve (or slide) each kernel across the width and height of the input volume and compute dot products between the entries of the kernel and inputs for a position or region of the image. Each output value in a convolution output is the result of a dot product between a kernel and some set of inputs from an example input tensor. The dot product can result in a convolution output that corresponds to a single layer input, e.g., an activation element that has an upper-left position in the overlapped multi-dimensional space. As discussed above, a neuron of a convolutional layer can be connected to a region of the input volume that includes multiple inputs. The machine learning model 120 can convolve each kernel over each input of an input volume. The machine learning model 120 can perform this convolution operation by, for example, moving (or sliding) each kernel over each input in the region.

The machine learning model 120 can move each kernel over inputs of the region based on a stride value for a given convolutional layer. For example, when the stride is set to 1, then the machine learning model 120 can move the kernels over the region one pixel (or input) at a time. Likewise, when the stride is 2, then the machine learning model 120 can move the kernels over the region two pixels at a time. Thus, kernels may be shifted based on a stride value for a layer and the machine learning model 120 can repeatedly perform this process until inputs for the region have a corresponding dot product. Related to the stride value is a skip value. The skip value can identify one or more sets of inputs (2×2), in a region of the input volume, that are skipped when inputs are loaded for processing at a neural network layer. In some implementations, an input volume of pixels for an image can be "padded" with zeros, e.g., around a border region of an image. This zero-padding is used to control the spatial size of the output volumes.

As discussed previously, a convolutional layer of CNN is configured to transform a three dimensional input volume (inputs of the region) to a multi-dimensional output volume of neuron activations. For example, as the kernel is convolved over the width and height of the input volume, the machine learning model 120 can produce a multi-dimensional activation map that includes results of convolving the kernel at one or more spatial positions based on the stride value. In some cases, increasing the stride value produces smaller output volumes of activations spatially. In some implementations, an activation can be applied to outputs of the convolution before the outputs are sent to a subsequent layer of the CNN.

An example convolutional layer can have one or more control parameters for the layer that represent properties of the layer. For example, the control parameters can include a number of kernels, K, the spatial extent of the kernels, F, the stride (or skip), S, and the amount of zero padding, P. Numerical values for these parameters, the inputs to the layer, and the parameter values of the kernel for the layer shape the computations that occur at the layer and the size of the output volume for the layer. In some implementations, the spatial size of the output volume is computed as a function of the input volume size, W, using the formula $(W-F+2P)/S+1$. For example, an input tensor can represent a pixel input volume of size [227×227×3]. A convolutional layer of a CNN can have a spatial extent value of F=11, a stride value of S=4, and no zero-padding (P=0). Using the above formula and a layer kernel quantity of K=96, the machine learning model 120 performs computations for the layer that results in a convolutional layer output volume of size [55×55×96], where 55 is obtained from $[(227-11+0)/4+1=55]$.

The computations (e.g., dot product computations) for a convolutional layer, or other layers, of a CNN involve performing mathematical operations, e.g., multiplication and addition, using a computation unit of a hardware circuit of the machine learning model 120. The design of a hardware circuit can cause a system to be limited in its ability to fully utilize computing cells of the circuit when performing computations for layers of a neural network. A more detailed example of the architecture of the system 100 having a machine learning model 120 that includes a CNN is discussed later with reference to FIG. 2.

In some implementations, the machine learning model 120 includes a recurrent attention model (RAM). The RAM can process the biological image data in a sequential manner, building up a dynamic representation of the biological image. For example, at each of a time step (t), the RAM can focus selectively on a given location in the a patch of the image, which refers to a discrete portion of the image. Then the RAM can extract features from the patch, update its internal state, and choose a next patch on which to focus. This process can be repeated for a fixed number of steps, during which the RAM is capable of incrementally combining the extracted features in a coherent manner. The general architecture of the RAM can be defined by a number of multi-layer neural networks, where each multi-layer neural network is capable of mapping some input vector into an output vector. A more detailed example of the architecture of the system 100 having a machine learning model 120 that includes a RAM is discussed later with reference to FIG. 3.

While this specification generally describes a patient as a human patient, implementations are not so limited. For example, a patient can refer to a non-human animal, a plant, or a human replica system.

Figure 2:
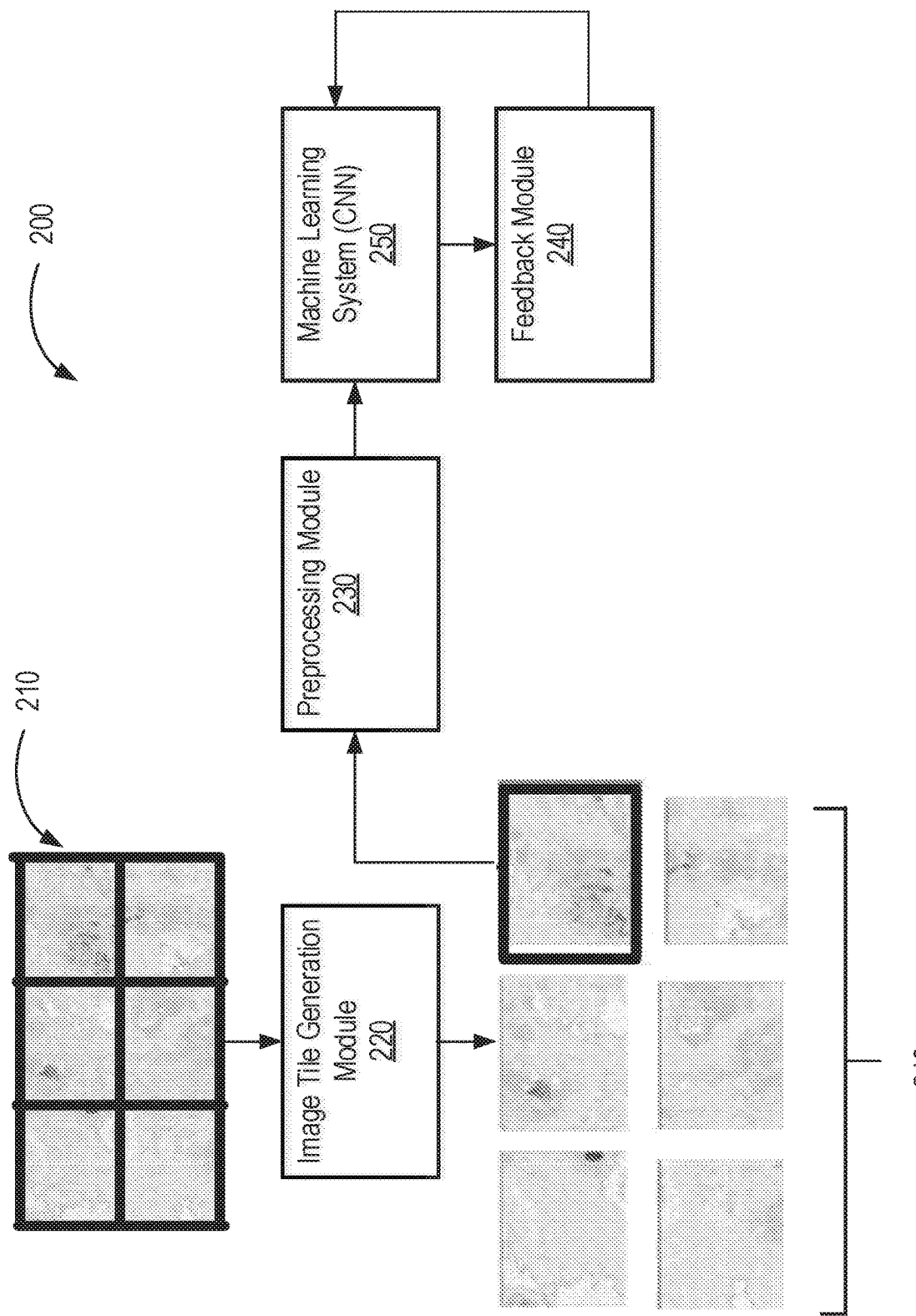
FIG. 2 is a flow diagram illustrating an example architecture of a data processing system.

FIG. 2 is a flow diagram illustrating an architecture of a data processing system 200. The data processing system 200 can be substantially similar to the data processing system 100 described previously with reference to FIG. 1. The data processing system 200 includes an image tile generation module 220, a preprocessing module 230, a feedback module 240, and a machine learning system 250. The modules 220, 230, 240 can be executed by, for example, the computer processors 110 of the data processing system 100 discussed previously with reference to FIG. 1.

The image tile generation module 220 is capable of receiving image data representing a biological image 210, and generating image tile data representing a plurality of image tiles 210*a* of the biological image 210. As shown, each of the plurality of image tiles 210*a* includes a discrete portion of the biological image 210. Although the shown implementation shows six image tiles 210*a*, the number of image tiles can be more or less than six, and the number can be chosen based on computational efficiency, computational power, and computational accuracy considerations. For example, the number of tiles per image can vary from a couple tiles to several thousands of tiles due to the heterogeneities of medical images (for example, as seen in immunohistochemistry images of biopsy samples from cancer patients.). Image tile data representing each of the image tiles 210*a* is transmitted to the preprocessing module 230. For each image tile, the preprocessing module 230 is capable of generating preprocessed image tile data by identifying one or more pixel locations of the image tile data corresponding to biological tissue, and color normalizing the identified locations, as discussed previously with reference to FIG. 1.

The preprocessed image tile data is transmitted to the machine learning system 250. As shown, the preprocessed image tile data is transmitted to the machine learning system 250 sequentially, in which preprocessed image tile data corresponding to a first image tile is transmitted to the machine learning system 250 at a first time, preprocessed image tile data corresponding to a second image tile is transmitted to the machine learning system 250 at a second time, and so on, until preprocessed image tile data corresponding to all (or a portion) of the image tiles has been received by the machine learning system 250.

In the shown implementation, the machine learning system 250 includes a CNN. The machine learning system 250 is capable of identifying, for each image tile, one or more pixel locations in the preprocessed image tile data representing one or more discrete tissue components that are predictive of a patient outcome to a given drug. The machine learning system 250 can assign values to the one or more pixel locations, and the assigned values can be weighted based on learned predictive efficacy of the identified discrete tissue components. The machine learning system 250 can aggregate the weighted values (for example, sum the weighted values, average the weighted values, and so forth) across all image tiles 210a to generate an aggregate weight value and, based on the aggregate weight value, predict a patient response (such as, an amount of reduction of a cancerous tumor). For example, the machine learning system 250 can predict the patient outcome based on a learned association between the aggregate weight value and the patient response. The predicted patient response can be transmitted to the feedback module 240, which is capable of comparing the predicted patient response with an observed patient response (for example, an observed experimental result), and generating an error value based on the comparison. The error value can be transmitted to the machine learning system 150, and the machine learning system can update its weights and biases in accordance with the error value. In some implementations, the feedback module 240 uses a cross-validation technique to validate the predicted outcomes. For example, in early phase of drug development, the entire database may be a small number of patients with medical images. To evaluate the robustness of the model fitted on such a small dataset, the statistical method, cross-validation, can be utilized. In the process of k-fold cross-validation, for example, the whole dataset can be randomly segmented into k approximately equal sized subsets. Each time one subset is held out as the validation data set, and the rest are used as the training set, a model is fit and its performance on the testing set can be recorded. Then, a different subset is held out as the validation set, and a new model is trained on the rest of the subsets. As an end result, every subset may have served as the validation set once, and the prediction results across all the k-fold validation are aggregated to obtain precision metrics, recall metrics, among others. These aggregated results can provide a more accurate measure of the robustness of the method.

Although specific modules, including the image tile generation module 220, the preprocessing module 230, and the feedback module 240 are described as carrying out certain aspects of the techniques described in this specification, some or all of the techniques may be carried out by additional, fewer, or alternative modules in some implementations.

Figure 3:
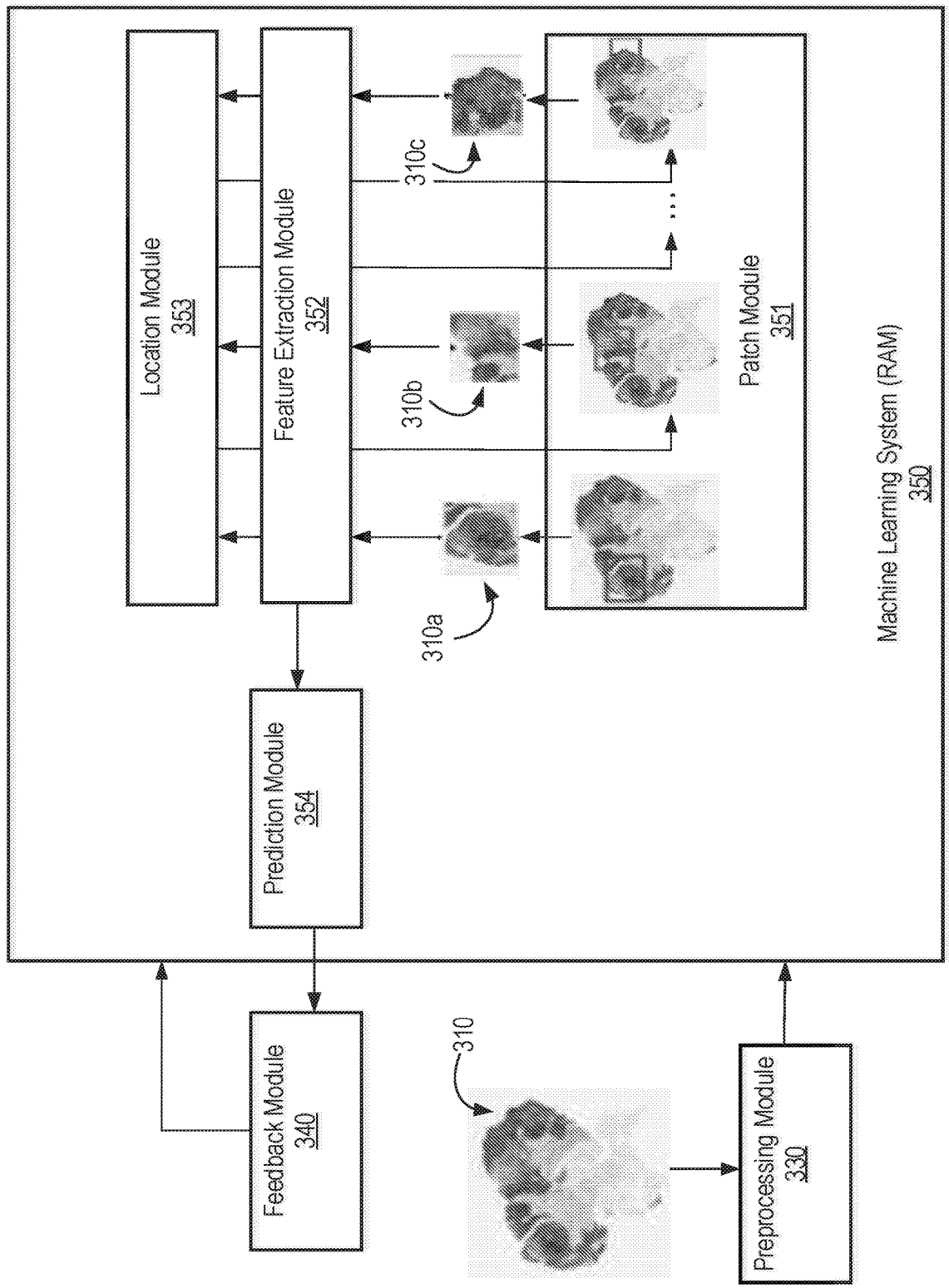
FIG. 3 is a flow diagram illustrating an example architecture of a data processing system.

FIG. 3 is a flow diagram illustrating an example architecture of a data processing system 300. The data processing system 300 includes a preprocessing module 330, a feedback module 340, and a machine learning system 350.

The preprocessing module 330 is configured to receive image data representing a biological image 310. In some implementations, the preprocessing module 330 is substantially similar to the preprocessing module 230 of the data processing system 200 discussed previously with reference to FIG. 2. Accordingly, the preprocessing module 330 is capable of identifying one or more pixel locations in the image data that represent biological tissue, and color normalizing the identified one or more pixel locations to generate preprocessed image data. The preprocessed image data can then be transmitted to the machine learning system 350.

The machine learning system 350 is capable of processing the preprocessed image data to predict a patient response for a given drug. In the shown implementation, the machine learning system 350 includes a RAM 350. The RAM 350 includes a patch module 351, a feature extraction module 352, a location module 353, and a prediction module 354.

In some implementations, the patch module 351 includes one or more convolutional layers (for example, 3 convolutional layers). In some implementations, the patch module 351 includes one or more max pooling layers, which refers to layers that can perform a sample-based discretization process. In some implementations, the patch module 351 includes one or more fully connected layers. In some implementations, the patch module 351, at each of a series of sequential time steps, receives location data of a corresponding patch. As discussed previously, a patch corresponds to a discrete portion of the image 310. The patch module 351 generates patch data representing each patch corresponding to the location data. For example, as shown, the patch module 351 generates a first patch 310a for the first time step. In some implementations, the patch module 351 chooses a first location for the first patch 310a randomly. In some implementations, the patch module 351 chooses the center of the image 310 as a first location for the first patch 310a.

The patch data corresponding to the first patch 310a is received by the feature extraction module 352. The feature extraction module 352 is capable of identifying one or more pixel locations of the first patch 310a that correspond to one or more discrete tissue components of the patient, and can assign a value for each of the one or more discrete tissue components based on a learned association between the one or more discrete tissue components and a patient response. In some implementations, the feature extraction module 352 includes two or more stacked long short-term memory units, which describes a neural network architecture that includes feedback connections that process single data points (such as images) and entire sequences of data (such as speech or video).

The location module 353 receives the assigned values and determines a next patch location based on the assigned values. The location of the next patch can be determined based upon an optimized protocol that the location module 353 learned through the process of reinforcement learning, in which different protocols can be evaluated and an optimal protocol can be decided that assigns a location for the next patch given: the location of the current patch, information extracted from previous patches, and maximizing a reward function, part of which can correspond to the prediction accuracy. The location module 353 generates location data indicating the location of the next patch to be processed.

The patch module 351 receives the location data generated by the location module 353, and generates patch data representing the second patch 310*b* to be processed. The aforementioned process of processing patches and choosing next locations continues until a final patch 310*c* is processed through the feature extraction module 352. Each assigned value is transmitted to the prediction module 354. Once the assigned values corresponding to all patches are received by the prediction module 354, the prediction module 354 predicts a patient response of a given drug by generating an aggregate value, and predicting the patient response based on a learned association between the aggregate value and the patient response. Data representing the predicted patient response is transmitted to the feedback module 340, which compares the predicted patient outcome with an observed outcome, and generates an error value. Data representing the error value is transmitted to the machine learning system 350, which updates its weights and biases accordingly. In some implementations, the feedback module 340 uses a cross-validation technique to validate the predicted outcomes, as discussed previously with reference to FIG. 2.

Although specific modules, including the preprocessing module 330, the patch module 351, the feature extraction module 352, the location module 353, the prediction module 354, and the feedback module 340 are described as carrying out certain aspects of the techniques described in this specification, some or all of the techniques may be carried out by additional, fewer, or alternative modules in some implementations.

Figure 4:
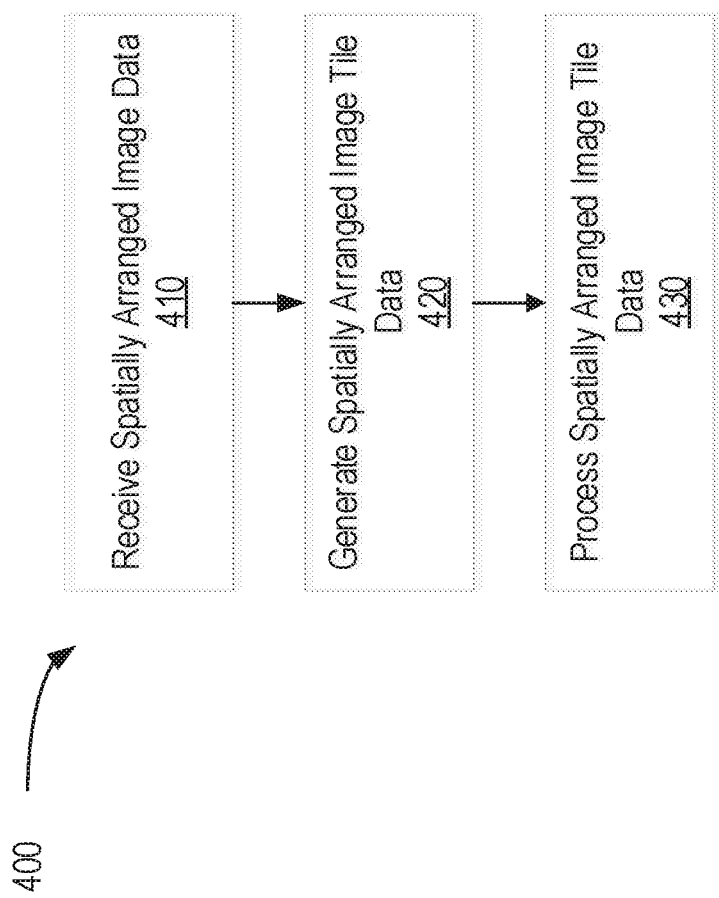
FIG. 4 is a flow chart illustrating an example method for predicting patient response to a chemical compound.

FIG. 4 is a flow chart illustrating an example method 400 for predicting patient response to a chemical compound. For illustrative purposes, the method 400 will be described as being performed by the data processing system 100 discussed previously with reference to FIG. 1. The method 400 includes receiving spatially arranged image data (block 410), generating spatially arranged image tile data (block 420), and processing the spatially arranged image tile data (block 430).

At block 410, the computer processors 110 receive spatially arranged image data representing a biological image of a patient. For example, as discussed previously with reference to FIG. 1, the biological image can be an immunohistochemistry image of the patient's biological tissue.

At block 420, the computer processors 110 generate spatially arranged image tile data representing image tiles of the image. For example, as discussed previously with reference to FIGS. 1-2, each image tile can include a discrete portions of the image.

At block 430, the machine learning model 120 processes the spatially arranged image tile data through one or more data structures storing one or more portions of executable logic included in the machine learning model 120 to predict one or more responses of a patient by identifying, for each image tile, one or more pixels of that image tile representing one or more locations of discrete biological tissue components of the patient. In some implementations, the machine learning model 120 can assign values to each identified locations of discrete biological tissue components. The values can be weighted based on, for example, a learned predictive power of an identified discrete biological tissue component. The values corresponding to all image tiles can be aggregated (for example, summed, averaged, and so forth) to generate an aggregate value, and the value can be used to predict the response. The response can be a response to a specific chemical compound, such as a drug. For example, a response can be an amount of reduction in a size of a cancerous tumor as a result of a patient undergoing an oncology drug treatment regimen.

As indicated previously with reference to FIGS. 1-2, before being processed by the machine learning model 120, the computer processors 110 can generate preprocessed image tile data in which, for each image tile, the computer processors 110 can identify one or more pixels of the corresponding image tile data that represent biological tissue and color normalize the identified one or more pixels.

Figure 5:
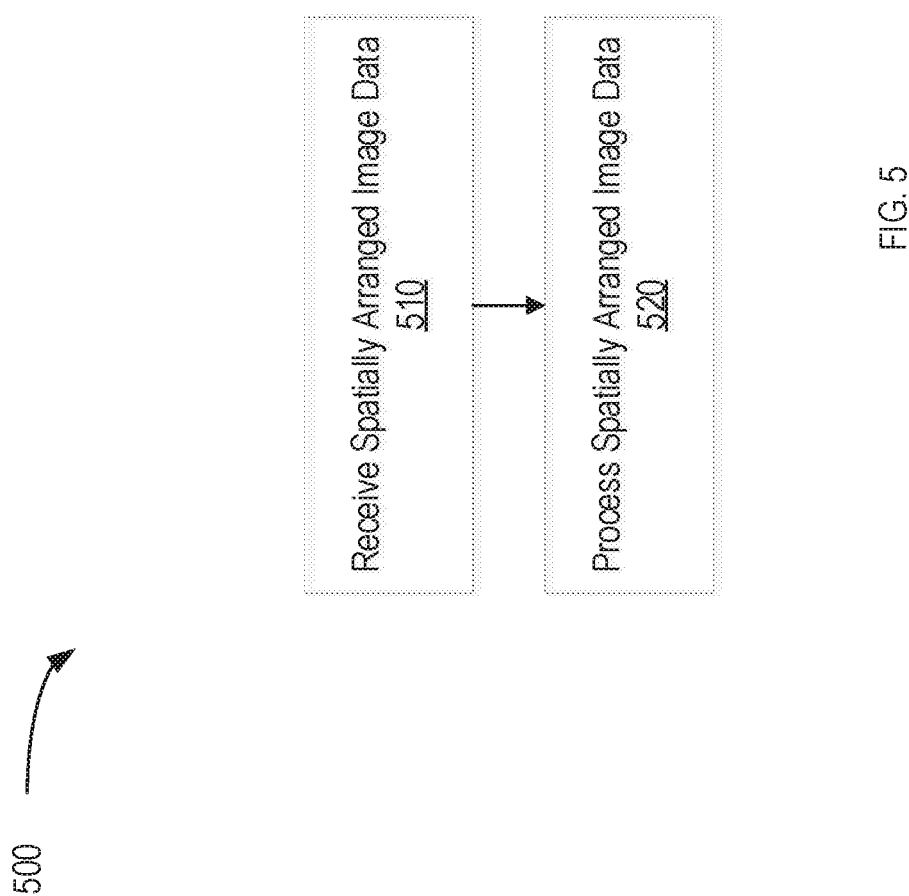
FIG. 5 is a flow chart illustrating an example method for predicting patient response to a chemical compound.

FIG. 5 is a flow chart illustrating an example method 500 for predicting patient response to a chemical compound. For illustrative purposes, the method 500 will be described as being performed by the system 100 discussed previously with reference to FIG. 1. The method 500 includes receiving spatially arranged image data (block 510) and processing the spatially arranged image data (block 520).

At block 510, the computer processors 110 receive spatially arranged image data representing a biological image of a patient. For example, as discussed previously with reference to FIG. 1, the biological image can be an immunohistochemistry image of the patient's biological tissue.

At block 520, the machine learning model 120 processes the spatially arranged image data through one or more data structures storing one or more portions of executable logic included in machine learning model 120 to predict one or more responses of a patient by identifying one or more pixels representing one or more locations of discrete biological tissue components of the patient. In some implementations, processing the spatially arranged image data includes selecting a first portion (for example, a first patch as described previously with reference to FIG. 3) of the spatially arranged image data and processing the first portion to identify one or more pixels of the first portion representing one or more locations of discrete biological tissue components corresponding to the first portion, as discussed previously with reference to FIG. 3. In some implementations, processing the spatially arranged image data includes selecting at least one subsequent portion (for example, a second patch as described previously with reference to FIG. 3) of the spatially arranged image data and processing the at least one subsequent portion to identify one or more pixels of the at least one subsequent portion representing one or more locations of discrete biological tissue components corresponding to the at least one subsequent portion, as discussed previously with reference to FIG. 3.

In some implementations, the machine learning model 120 can, for each patch, assign values to each identified locations of discrete biological tissue components. The values can be weighted based on, for example, a learned predictive power of a discrete biological tissue component. The values corresponding to all patches can be aggregated (for example, summed, averaged, and so forth) to generate an aggregate value, and the value can be used to predict the response. The response can be a response to a specific chemical compound, such as a drug. For example, a response can be an amount of reduction in a size of a cancerous tumor as a result of a patient undergoing an oncology drug treatment regimen.

Figure 6:
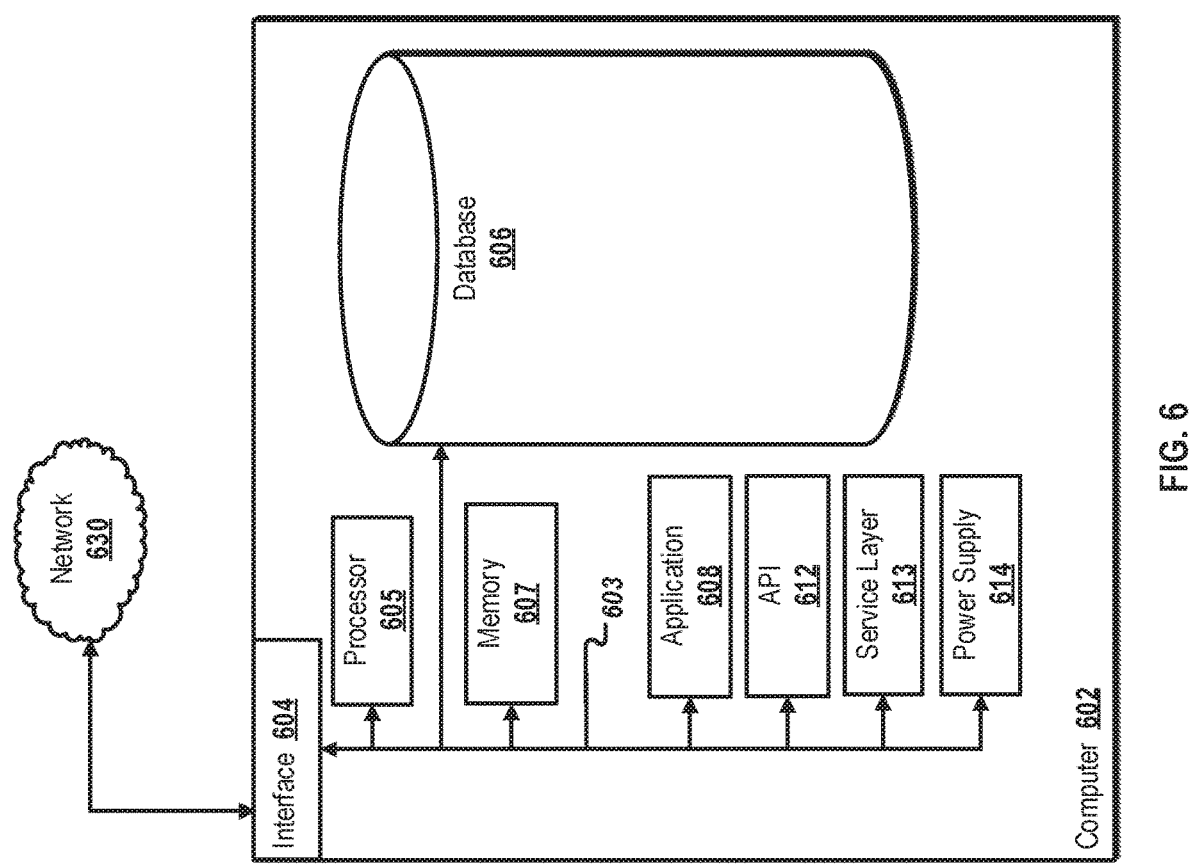
FIG. 6 is a block diagram of an example computer system used to provide computational functionalities associated with described algorithms, methods, functions, processes, flows, and procedures described in the present disclosure

FIG. 6 is a block diagram of an example computer system 600 used to provide computational functionalities associated with described algorithms, methods, functions, processes, flows, and procedures described in the present disclosure (such as the system 200 described previously with reference to FIG. 2 and the system 300 described previously with reference to FIG. 3), according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component (for example, as a data server), or that includes a middleware component (for example, an application server). Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising" or "further including" in the foregoing description or following claims, what follows this phrase can be an additional step or entity, or a sub-step/sub-entity of a previously-recited step or entity.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A data processing system, comprising:
a computer-readable memory comprising computer-executable instructions; and
at least one processor configured to execute executable logic including an artificial neural network trained to predict a response to a chemical substance by identifying one or more discrete biological tissue components in an input biological image, wherein when the at least one processor is executing the computer-executable instructions, the at least one processor is configured to carry out operations comprising:
receiving image data representing a biological image of a patient;
processing the image data using the artificial neural network and in accordance with trained values of a set of artificial neural network parameters to generate a response score that defines a predicted response of the patient to the chemical substance, wherein the processing comprises, at each of a plurality of time steps in a sequence of time steps:
obtaining current location data for the time step that defines a location of a current patch of the biological image;
processing the current patch of the biological image using a feature extraction module of the artificial neural network to generate a feature representation of the current patch of the biological image that characterizes locations of discrete biological tissue components in the current patch of the biological image;
processing the feature representation of the current patch of the biological image using a location module of the artificial neural network to generate a next location data for a next time step that defines a location of a next patch of the biological image to be processed at a next time step; and
providing the next location data for processing at the next time step in the sequence of time steps; and
wherein the processing further comprises generating the response score that defines the predicted response of the patient to the chemical substance based on the feature representations of the patches of the biological image.

2. The data processing system of claim 1, wherein the biological image comprises an immunohistochemistry image.

3. The data processing system of claim 1, wherein the artificial neural network comprises a deep recurrent attention model.

4. The data processing system of claim 1, the operations further comprising:
generating preprocessed spatially arranged image data representing a preprocessed biological image;
wherein generating preprocessed spatially arranged image data comprises identifying one or more pixels of the biological image representing one or more locations of biological tissue and color normalizing one or more locations of biological tissue.

5. The data processing system of claim 1, wherein the predicted response of the patient to the chemical substance defines a predicted reduction in a size of a tumor.

6. The data processing system of claim 1, wherein the feature extraction module and the location module of the artificial neural network have been jointly trained to optimize a reinforcement learning objective function.

7. The data processing system of claim 1, wherein the chemical substance comprises a drug for treating a medical condition, wherein the patient has the medical condition.

8. A method performed by at least one processor executing executable logic including at an artificial neural network trained to predict a response to a chemical substance by identifying one or more discrete biological tissue components in an input biological image, the method comprising:
receiving image data representing a biological image of a patient;
processing the image data using the artificial neural network and in accordance with trained values of a set of artificial neural network parameters to generate a response score that defines a predicted response of the patient to the chemical substance, wherein the processing comprises, at each of a plurality of time steps in a sequence of time steps:
obtaining current location data for the time step that defines a location of a current patch of the biological image;
processing the current patch of the biological image using a feature extraction module of the artificial neural network to generate a feature representation of the current patch of the biological image that characterizes locations of discrete biological tissue components in the current patch of the biological image;
processing the feature representation of the current patch of the biological image using a location module of the artificial neural network to generate a next location data for a next time step that defines a location of a next patch of the biological image to be processed at a next time step; and providing the next location data for processing at the next time step in the sequence of time steps; and wherein the processing further comprises generating the response score that defines the predicted response of the patient to the chemical substance based on the feature representations of the patches of the biological image.

9. The method of claim 8, wherein the biological image comprises an immunohistochemistry image.

10. The method of claim 8, wherein the artificial neural network comprises a deep recurrent attention model.

11. The method of claim 8, further comprising:
generating preprocessed spatially arranged image data representing a preprocessed biological image;
wherein generating preprocessed spatially arranged image data comprises identifying one or more pixels of the biological image representing one or more locations of biological tissue and color normalizing one or more locations of biological tissue.

12. The method of claim 8, wherein the predicted response of the patient to the chemical substance defines a predicted reduction in a size of a tumor.

13. The method of claim 8, wherein the feature extraction module and the location module of the artificial neural network have been jointly trained to optimize a reinforcement learning objective function.

14. The method of claim 8, wherein the chemical substance comprises a drug for treating a medical condition, wherein the patient has the medical condition.

15. One or more non-transitory computer storage media storing instructions that when executed by one or more computers cause the one or more computers to perform operations comprising:
receiving image data representing a biological image of a patient;
processing the image data using an artificial neural network and in accordance with trained values of a set of artificial neural network parameters to generate a response score that defines a predicted response of the patient to a chemical substance, wherein the processing comprises, at each of a plurality of time steps in a sequence of time steps:
obtaining current location data for the time step that defines a location of a current patch of the biological image;

processing the current patch of the biological image using a feature extraction module of the artificial neural network to generate a feature representation of the current patch of the biological image that characterizes locations of discrete biological tissue components in the current patch of the biological image;

processing the feature representation of the current patch of the biological image using a location module of the artificial neural network to generate a next location data for a next time step that defines a location of a next patch of the biological image to be processed at a next time step; and providing the next location data for processing at the next time step in the sequence of time steps; and wherein the processing further comprises generating the response score that defines the predicted response of the patient to the chemical substance based on the feature representations of the patches of the biological image.

16. The non-transitory computer storage media of claim 15, wherein the biological image comprises an immunohistochemistry image.

17. The non-transitory computer storage media of claim 15, wherein the artificial neural network comprises a deep recurrent attention model.

18. The non-transitory computer storage media of claim 15, wherein the operations further comprise:
generating preprocessed spatially arranged image data representing a preprocessed biological image;
wherein generating preprocessed spatially arranged image data comprises identifying one or more pixels of the biological image representing one or more locations of biological tissue and color normalizing one or more locations of biological tissue.

19. The non-transitory computer storage media of claim 15, wherein the predicted response of the patient to the chemical substance defines a predicted reduction in a size of a tumor.

20. The non-transitory computer storage media of claim 15, wherein the feature extraction module and the location module of the artificial neural network have been jointly trained to optimize a reinforcement learning objective function.

* * * * *